US012773898B2

(12) United States Patent
Hayashi et al.

(10) Patent No.: US 12,773,898 B2
(45) Date of Patent: Oct. 27, 2026

(54) VEHICLE CONTROL DEVICE

(71) Applicant: MITSUBISHI JIDOSHA KOGYO KABUSHIKI KAISHA, Tokyo (JP)

(72) Inventors: Hiroki Hayashi, Tokyo (JP); Hirofumi Yagura, Tokyo (JP); Hiroyasu Yamashita, Tokyo (JP); Ryo Shimizu, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 119 days.

(21) Appl. No.: 18/845,816

(22) PCT Filed: Mar. 11, 2022

(86) PCT No.: PCT/JP2022/011010
§ 371 (c)(1),
(2) Date: Mar. 27, 2025

(87) PCT Pub. No.: WO2023/170951
PCT Pub. Date: Sep. 14, 2023

(65) Prior Publication Data
US 2026/0027887 A1 Jan. 29, 2026

(51) Int. Cl.
*B60K 6/44* (2007.10)
*B60K 6/442* (2007.10)
(Continued)

(52) U.S. Cl.
CPC ............. *B60K 6/442* (2013.01); *B60W 10/06* (2013.01); *B60W 10/08* (2013.01); *B60W 20/13* (2016.01);
(Continued)

(58) Field of Classification Search
CPC ....... B60K 6/442; B60W 10/06; B60W 10/08; B60W 2510/244; B60W 20/13;
(Continued)

(56) References Cited

U.S. PATENT DOCUMENTS 9,168,916 B2 * 10/2015 Park ...................... B60W 20/13
9,242,641 B2 1/2016 Martin et al.
(Continued)

FOREIGN PATENT DOCUMENTS

JP 2003-146115 A 5/2003
JP 2003-286872 A 10/2003
(Continued)

OTHER PUBLICATIONS

International Search Report for PCT/JP2022/011010 mailed on May 24, 2022.
(Continued)

*Primary Examiner* — Farhana Pervin
(74) *Attorney, Agent, or Firm* — Birch, Stewart, Kolasch & Birch, LLP

(57) ABSTRACT

A device (108) for controlling a vehicle (100) that is capable of traveling in a parallel mode using engine drive torque provided by an engine (101) and motor assist torque provided by a motor (107), the control device comprising a control unit that causes the vehicle to travel using the engine drive torque and the motor assist torque when a requested drive torque exceeds a first threshold value, and the first threshold value being a value at which the fuel consumption rate of output from the engine becomes worse than the fuel consumption rate of the output from the motor and being set lower than the maximum torque that can be outputted by the engine.

5 Claims, 12 Drawing Sheets

(51) Int. Cl.
*B60W 10/06* (2006.01)
*B60W 10/08* (2006.01)
*B60W 20/13* (2016.01)
*B60W 20/40* (2016.01)
*B60W 30/188* (2012.01)

(52) U.S. Cl.
CPC ........ *B60W 20/40* (2013.01); *B60W 30/1882* (2013.01); *B60W 2510/244* (2013.01); *B60W 2710/0666* (2013.01); *B60W 2710/083* (2013.01)

(58) Field of Classification Search
CPC .. B60W 20/40; B60W 20/10; B60W 30/1882; B60W 2710/0666; B60W 2710/083; B60W 2540/103; B60W 2540/10; Y02T 10/62
See application file for complete search history.

(56) References Cited

U.S. PATENT DOCUMENTS

2015/0066265 A1 3/2015 Martin et al.
2016/0068152 A1* 3/2016 Lear ...................... B60W 20/15 180/65.265
2017/0291598 A1* 10/2017 Murase .................. B60K 6/442
2018/0072307 A1* 3/2018 Oguma ................. B60W 10/18
2018/0229715 A1* 8/2018 Kinoshita .............. B60K 6/485
2019/0359201 A1* 11/2019 Komuro ................ B60W 20/13
2020/0172083 A1* 6/2020 Cho .................. B60W 30/1882
2021/0016774 A1* 1/2021 Cho ...................... B60W 10/08
2021/0323532 A1* 10/2021 Huh ...................... B60W 20/13
2022/0219673 A1* 7/2022 Watanabe ........... B60W 50/085
2023/0339451 A1* 10/2023 Yang ..................... B60W 20/20

FOREIGN PATENT DOCUMENTS

JP 2005-6470 A 1/2005
JP 2010-195165 A 9/2010

OTHER PUBLICATIONS

Written Opinion of the International Searching Authority for PCT/JP2022/011010 mailed on May 24, 2022.
Extended European Search Report for European Application No. 22930932.3, dated Jul. 14, 2025.

* cited by examiner

VEHICLE CONTROL DEVICE

TECHNICAL FIELD

The present invention relates to a vehicle control device.

BACKGROUND ART

A hybrid vehicle equipped with an engine and a rotating electric machine (motor, generator, motor generator) has become widespread. The hybrid vehicle has a plurality of traveling modes. The traveling modes include an Electric Vehicle (EV) mode in which the vehicle travels only by the motor using charged electric power from a battery, a series mode in which the vehicle travels only by the motor while the engine causes the generator to generate electricity, and a parallel mode in which the vehicle travels mainly by the engine while being assisted with the motor if necessary.

Further, when using two power sources including an engine and a motor, there is a demand for efficient use of fuel, for example by switching between modes. For example, Patent Literature 1 discloses a configuration that efficiently uses an engine and a motor to stabilize acceleration performance of a vehicle while reducing an amount of fuel consumption.

CITATION LIST

Patent Literature

Patent Literature 1: JP2003-146115A

SUMMARY OF INVENTION

Technical Problem

When using a parallel mode in which an engine and a motor can be used simultaneously as drive sources, it is necessary to consider a balance between a driving force provided by the engine as a power source and a driving force provided by the motor as an assist in order to improve fuel consumption rate (fuel efficiency). Also, as a result of more efficient torque output from the engine, a required torque may be exceeded, and by using this surplus power as power for generating electricity, unnecessary energy consumption can be reduced. There is a demand for traveling control with better fuel efficiency that takes into account timing of switching between traveling and power generation based on a driving force from the engine, and timing of assist using a driving force from the motor.

The present invention is devised in view of the above-described problems, and has an object to perform fuel-efficient traveling control in a parallel mode in which an engine and a motor can be used as drive sources. However, this is not the only object, and another object of the present invention is to achieve an operational effect that cannot be obtained by technology of the related art, which is derived from configurations shown in embodiments described below.

Solution to Problem

A control device for a vehicle according to an embodiment of the present invention has the following configuration. That is, there is provided a control device for a vehicle that can travel in a parallel mode using an engine drive torque by an engine and a motor assist torque by a motor, the control device including a controller configured to cause the vehicle to travel using the engine drive torque and the motor assist torque when a required drive torque exceeds a first threshold, in which the first threshold is set to a value at which a fuel consumption rate of an output by the engine becomes worse than a fuel consumption rate of an output by the motor, and is set to a value lower than a maximum torque that can be output by the engine.

Advantageous Effects of Invention

According to the present invention, in a parallel mode in which an engine and a motor can be used as drive sources, it is possible to perform traveling control with better fuel efficiency than that of the related art.

DESCRIPTION OF EMBODIMENTS

Figure 1:
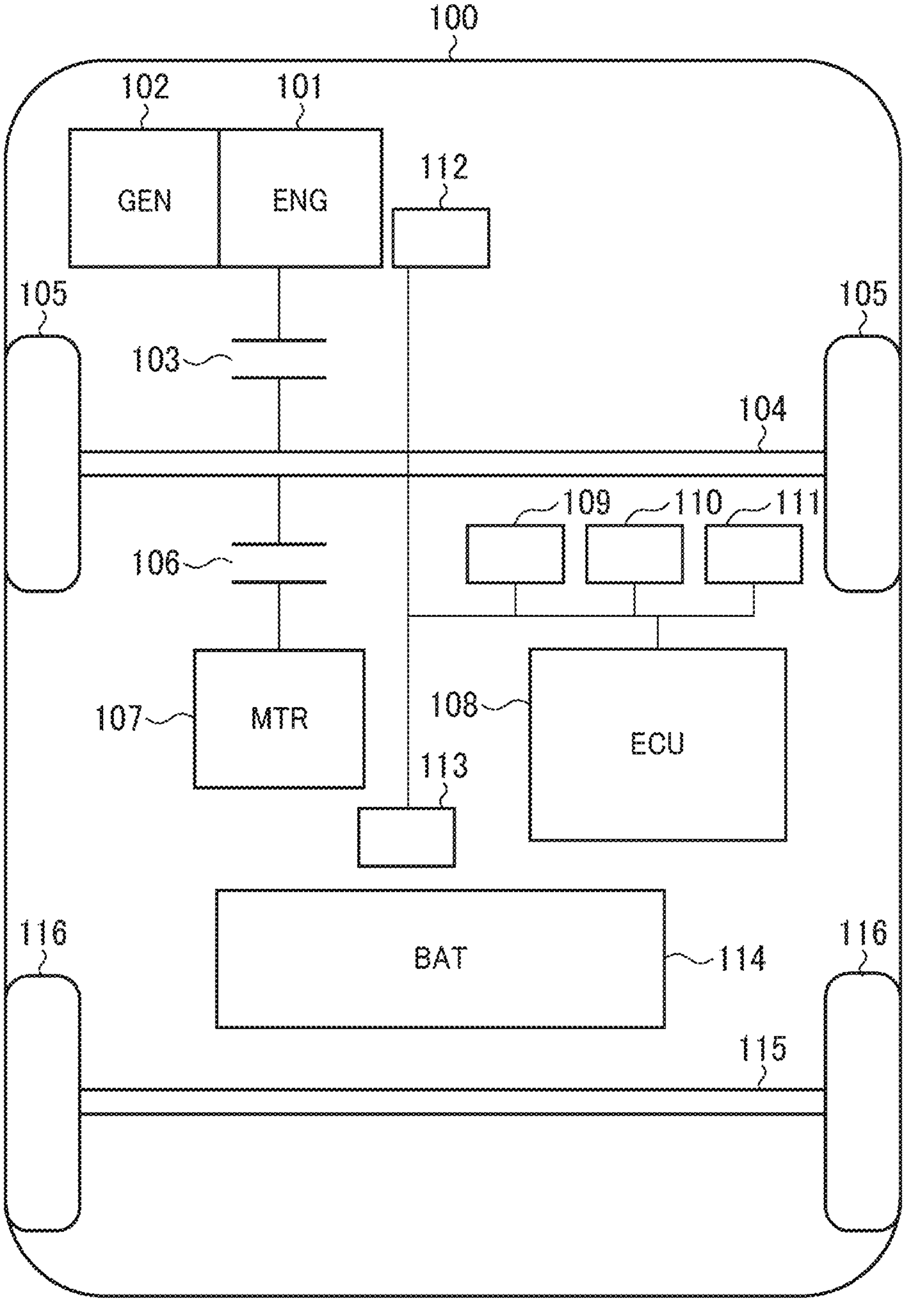
FIG. 1 is a schematic diagram illustrating an example of a configuration of a vehicle according to an embodiment of the present invention.

A vehicle control device as embodiments will be described with reference to the drawings. The embodiments described below are merely examples, and are not intended to exclude various modifications or application of techniques not explicitly stated in the following embodiments. Each configuration of these embodiments can be modified in various ways without departing from the spirit of these embodiments. Further, components can be selected or combined as needed. In addition, the same components in each drawing are given the same reference signs to indicate correspondence.

First Embodiment

[Overall Configuration]

A vehicle 100 to which a control device according to this embodiment can be applied will be described. The vehicle 100 is a hybrid vehicle equipped with an engine 101 as a drive source, a motor 107 (rotating electric machine) for traveling, and a generator 102 for generating electricity. Therefore, the vehicle 100 according to this embodiment can be a Hybrid Electric Vehicle (HEV), or Plug in Hybrid Electric Vehicle (PHEV: a plug-in hybrid capable of external charging or external electric power supply). In this embodiment, the vehicle 100 will be described as a front-wheel drive vehicle, but is not limited to this.

The generator 102 is connected to the engine 101 and can operate independently of an operation of the motor 107. The engine 101 is connected to a drive shaft 104 via an engine clutch 103. When the engine clutch 103 is engaged, the power generated by the engine 101 is transmitted to the drive shaft 104. The motor 107 is connected to the drive shaft 104 via a motor clutch 106. When the motor clutch 106 is engaged, the power generated by the motor 107 is transmitted to the drive shaft 104. For convenience, a power transmission path via the engine clutch 103 is also referred to as a "first power transmission path", and a power transmission path via the motor clutch 106 is also referred to as a "second power transmission path".

Driving wheels 105 (front wheels) are mounted on the drive shaft 104. Driven wheels 116 (rear wheels) are mounted on an axle 115.

The vehicle 100 is also provided with an Electronic Control Unit (ECU) 108, which corresponds to a control device according to this embodiment. The ECU 108 is, for example, an electronic control device configured as a Large-Scale Integration (LSI) device or an embedded electronic device that integrates a microprocessor, a Read Only Memory (ROM), a Random Access Memory (RAM), and the like. The ECU 108 acquires signals detected by various sensors provided in the vehicle 100, and controls the vehicle 100. The sensors provided in the vehicle 100 include an accelerator opening sensor 109, a brake sensor 110, a speed sensor 111, an engine rotation sensor 112, and a battery remaining charge sensor 113. The accelerator opening sensor 109 detects an amount (accelerator opening) of depression of an accelerator pedal (not illustrated). The brake sensor 110 detects an amount of depression of a brake pedal (not illustrated). The speed sensor 111 detects the vehicle speed of the vehicle 100. The engine rotation sensor 112 detects the rotation speed of the engine 101. The battery remaining charge sensor 113 detects a remaining charge (State Of Charge: SOC) of a battery 114. The vehicle 100 is also provided with the battery 114 for driving, which supplies and charges electric power.

The engine 101 is an internal combustion engine (gasoline engine, diesel engine) that uses gasoline or light oil as fuel. An operating state of the engine 101 may be controlled by the ECU 108, or may be controlled by an electronic control device (not illustrated) separate from the ECU 108. The generator 102 and motor 107 in this embodiment are electric generators (motor generators) that function both as an electric motor and as a generator. The motor 107 is a drive source that exchanges electric power with the battery 114, and mainly functions as an electric motor to drive the vehicle 100 and functions as a generator during regeneration.

The generator 102 functions as an electric motor (starter) when starting the engine 101, and is driven by the engine power to generate electricity when the engine 101 is operating. Further, the generator 102 transmits a driving force to the drive shaft 104 of the vehicle 100 in a power running state. An inverter (not illustrated) that converts DC current and AC current is provided around (or inside) each of the motor 107 and the generator 102. The rotational speeds and operating states (power running operation, regenerative/generative operation) of the motor 107 and the generator 102 are controlled by controlling the inverters (not illustrated).

The vehicle 100 can travel in a plurality of traveling modes, such as EV mode, series mode, and parallel mode. These traveling modes are alternatively selected by the ECU 108 depending on the vehicle state, traveling state, driving force required by a driver, and the like. In addition, the operation of the engine 101, generator 102, and motor 107 is controlled and used appropriately depending on the traveling mode.

The EV mode is a traveling mode in which the vehicle 100 is driven only by the motor 107 using charged electric power of the battery 114 for driving while the engine 101 and the generator 102 are stopped. The EV mode is selected, for example, when the required driving force and the vehicle speed are both low or when a charged level of the battery 114 is high. The series mode is a traveling mode in which the engine 101 drives the generator 102 to generate electricity and the motor 107 drives the vehicle 100 using the generated electric power. The series mode is selected, for example, when the required driving force is high or the charged level of the battery 114 is low: The parallel mode is a traveling mode in which the vehicle 100 is driven mainly by the driving force of the engine 101 and the motor 107 assists in driving the vehicle 100 as necessary. The parallel mode is selected, for example, when the vehicle speed is high or the required driving force is high. In this embodiment, in the parallel mode, a part (surplus torque) of the driving force of the engine 101 can also be used as power for generating electricity for the battery 114.

The engine 101 and motor 107 are connected in parallel to the drive wheels 105 (here, the front wheels) via a transaxle (not illustrated) that contains multiple gears and clutches. The engine 101 is also connected to the generator 102 via the transaxle (not illustrated), and the power of the engine 101 is also transmitted to the generator 102.

The transaxle is a power transmission device that integrates a final drive (final speed reducer) including a differential device and a transmission (speed reducer), and contains multiple mechanisms that transmit power between a drive source and a driven device.

The engine clutch 103 is, for example, a wet multi-plate clutch or a dog clutch. Power on an upstream side (the side of the engine 101 and generator 102) of the power transmission path with respect to the engine clutch 103 is transmitted to the drive shaft 104 when the engine clutch 103 is in an engaged state (connected state), and is cut off when the engine clutch 103 is in a disconnected state (released state). The connected/disconnected state of the engine clutch 103 is controlled by the ECU 108.

The motor clutch 106 is, for example, a wet multi-plate clutch or a dog clutch. Power (that is, the driving force of the motor 107) on an upstream side of the power transmission path with respect to the motor clutch 106 is transmitted to the drive shaft 104 when the motor clutch 106 is in the engaged state, and is cut off when the motor clutch 106 is in the disconnected state. The connected/disconnected state of the motor clutch 106 is controlled by the ECU 108.

For example, when the traveling mode is EV mode or series mode, the engine clutch 103 is in the disconnected state and the motor clutch 106 is in the engaged state. When the traveling mode is parallel mode and motor assist (a driving force of the motor 107) is not required, the engine clutch 103 is in the engaged state and the motor clutch 106 is in the disconnected state. When the traveling mode is parallel mode and motor assist is required, both the engine clutch 103 and the motor clutch 106 are in the engaged state.

[Traveling Control]

Figure 2:
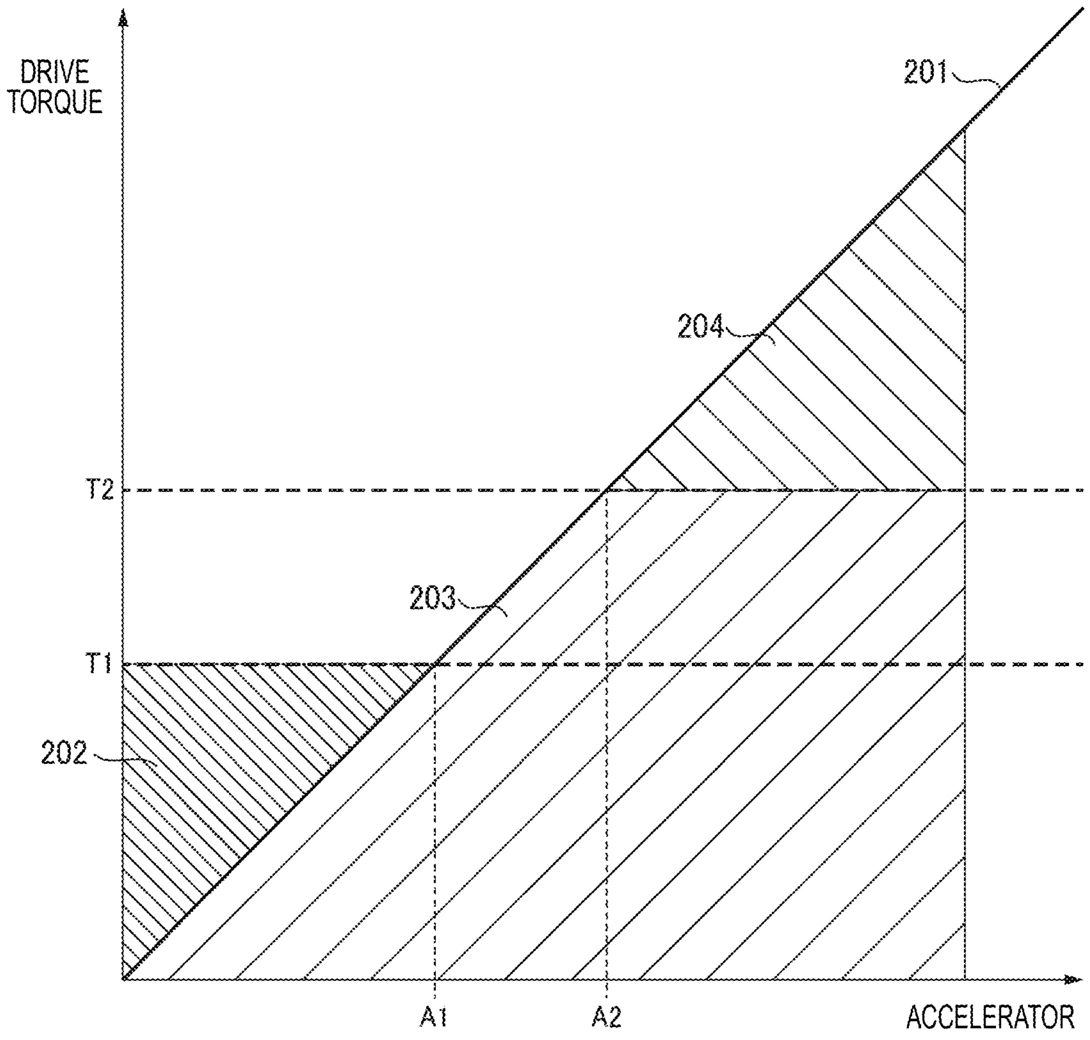
FIG. 2 is a graph for illustrating traveling control in a parallel mode of the related art.

The following describes a problem with traveling control of the related art in a parallel mode with reference to the drawings. FIG. 2 is a graph for illustrating traveling control in a parallel mode of the related art. In FIG. 2, a vertical axis represents a drive torque, and a horizontal axis represents an amount of accelerator operation. As described above, the parallel mode is a mode in which driving force from the engine is mainly used for traveling. A graph 201 shows a drive torque (hereinafter referred to as a "required drive torque") required for traveling. To simplify the description, an example is shown in which the required drive torque changes at the same change rate depending on the amount of accelerator operation, but the change rate is not necessarily limited to this.

When the engine is operated, it is controlled to have a predetermined drive torque in order to operate the engine in a state with the best possible fuel efficiency. Here, the drive torque obtained by operating the engine in a fuel-efficient state is referred to as an "engine fuel efficiency torque". Further, the maximum drive torque that the engine can output is referred to as an "engine maximum torque". In FIG. 2, T1 corresponds to the engine fuel efficiency torque, and T2 corresponds to the engine maximum torque.

In FIG. 2, an area 202 shows a drive torque (hereinafter referred to as an "engine power generation torque") for generating electricity in the drive torque due to the engine output. An area 203 shows a drive torque (hereinafter referred to as an "engine drive torque") for traveling in the drive torque due to the engine output. An area 204 shows an assist torque (hereinafter referred to as a "motor assist torque") due to the motor output.

First, when the amount of accelerator operation is in a range of 0 to A1, by operating the engine in the fuel-efficient state, the required drive torque becomes lower than the engine fuel efficiency torque. Therefore, a difference ((engine fuel efficiency torque)−(required drive torque)) is used as power to generate electricity (corresponding to area 202). In other words, when the amount of accelerator operation is between 0 and A1, the torque (that is, the engine fuel efficiency torque) due to the engine output is used for traveling and charging the battery:

When the amount of accelerator operation is in a range of A1 to A2, the required drive torque exceeds the engine fuel efficiency torque, so the drive torque generated by the engine output is increased as the amount of accelerator operation increases. In this case, charging (that is, power generation by the engine power generation torque) of the battery is stopped. A2 is an amount of accelerator operation that corresponds to that when the engine maximum torque is output.

When the amount of accelerator operation increases further and exceeds A2, the engine outputs the engine maximum torque while providing assistance through the motor assist torque. Therefore, the required drive torque is provided by the sum of the engine maximum torque and the motor assist torque. The motor assist torque can be output by driving the motor using the electric power charged in the battery in the range of 0 to A1.

Figure 3:
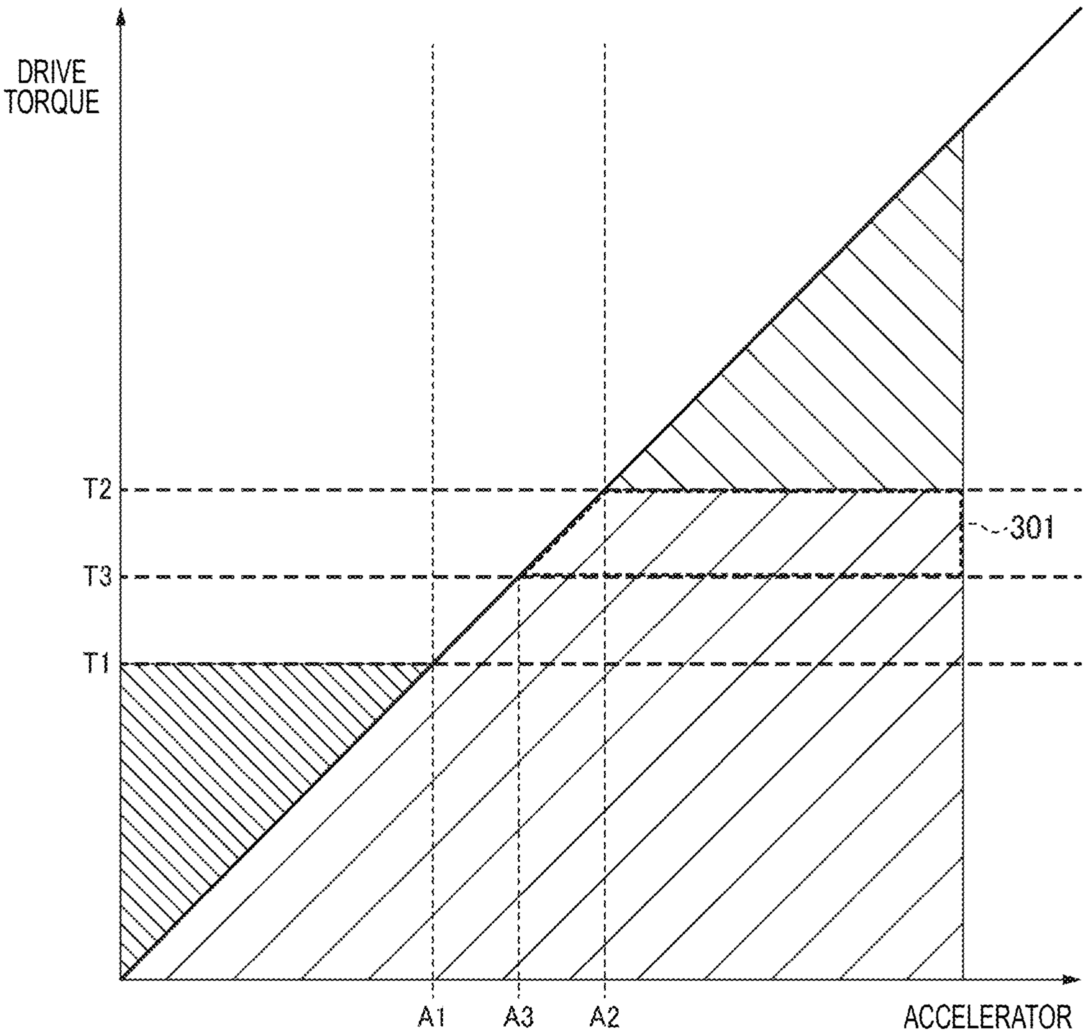
FIG. 3 is a graph for illustrating traveling control in the parallel mode of the related art.
Figure 4:
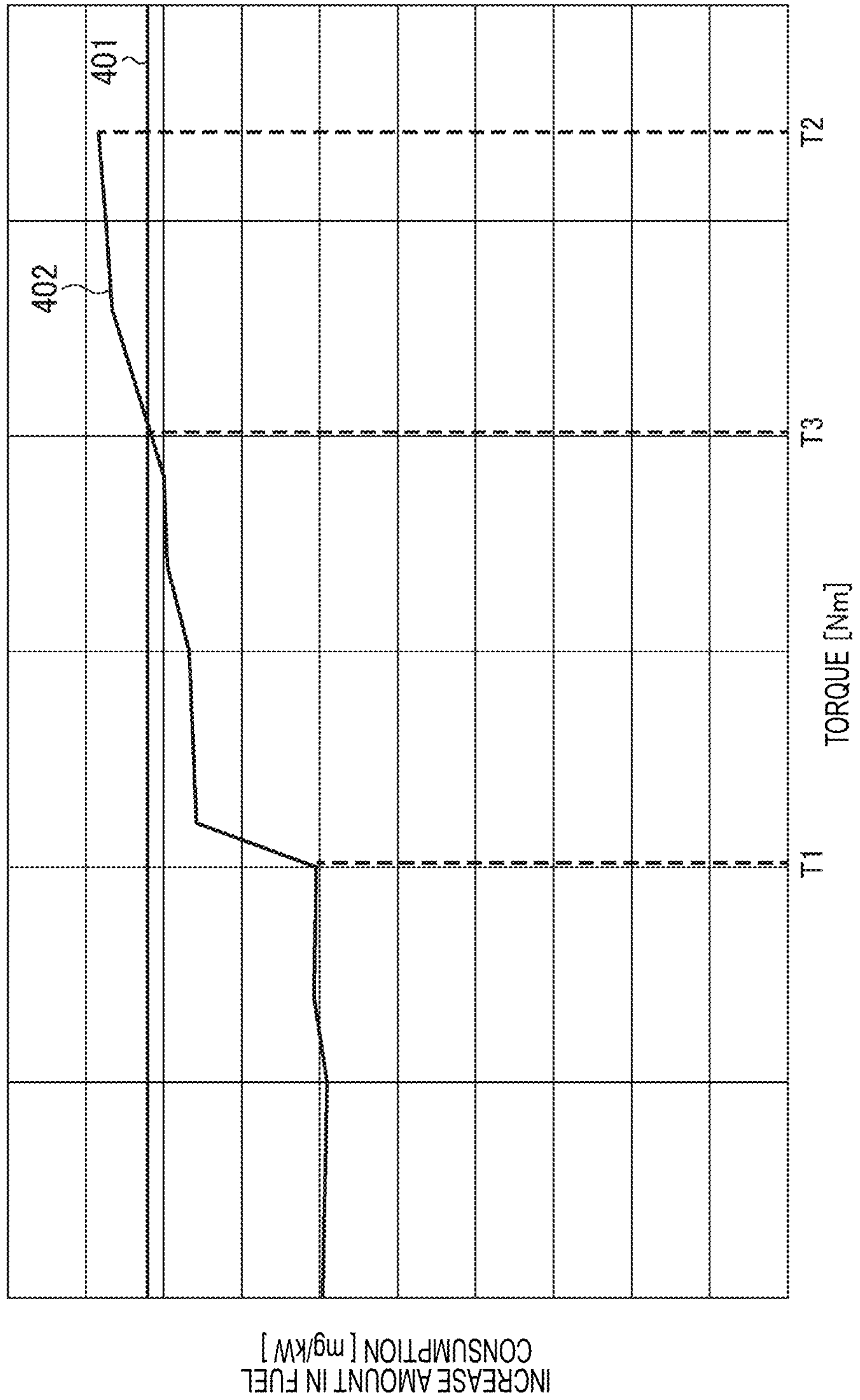
FIG. 4 is a graph for illustrating changes in fuel consumption rates of an engine and a motor.

Here, the fuel efficiency in a range shown in an area 301 in FIG. 3 will be described. FIG. 4 is a diagram for illustrating changes in fuel efficiency of the engine and the motor. In FIG. 4, a vertical axis represents an increase amount in fuel consumption [mg/kW], and a horizontal axis represents a torque [Nm]. Torque values T1, T2, and T3 shown in FIG. 3 and FIG. 4 correspond to each other.

A graph 401 shows an increase amount in fuel consumption when motor output increases by 1 kW. As shown in the graph 401, the increase amount in fuel consumption at motor output is constant regardless of changes in torque. A graph 402 shows an increase amount in fuel consumption when engine output increases by 1 kW. As shown in the graph 402, the increase amount in fuel consumption at engine output changes with the changes in torque. In particular, after exceeding an engine fuel efficiency torque T1, an increase amount in fuel consumption per 1 kW increases with increasing torque.

More specifically, in a torque range of 0 to T1, torque output by the engine is more fuel efficient than torque output by the motor. Further, in a torque range of T1 to T3, engine fuel efficiency deteriorates, but torque output by the engine is more fuel efficient than torque output by the motor. Once the torque exceeds T3, torque output by the motor is more fuel efficient than torque output by the engine. In other words, in a torque range of T3 to T2, torque output by the motor is more fuel efficient than torque output by the engine, so in the area 301 in FIG. 3, traveling control with poor fuel efficiency is being performed.

Therefore, in this embodiment, control is performed to improve fuel efficiency in the range described above. In this embodiment, control is performed to start assisting with the output of the motor 107 at a position corresponding to T3 in FIG. 4. Hereinafter, T3 is also referred to as an "assist start torque".

Figure 5:
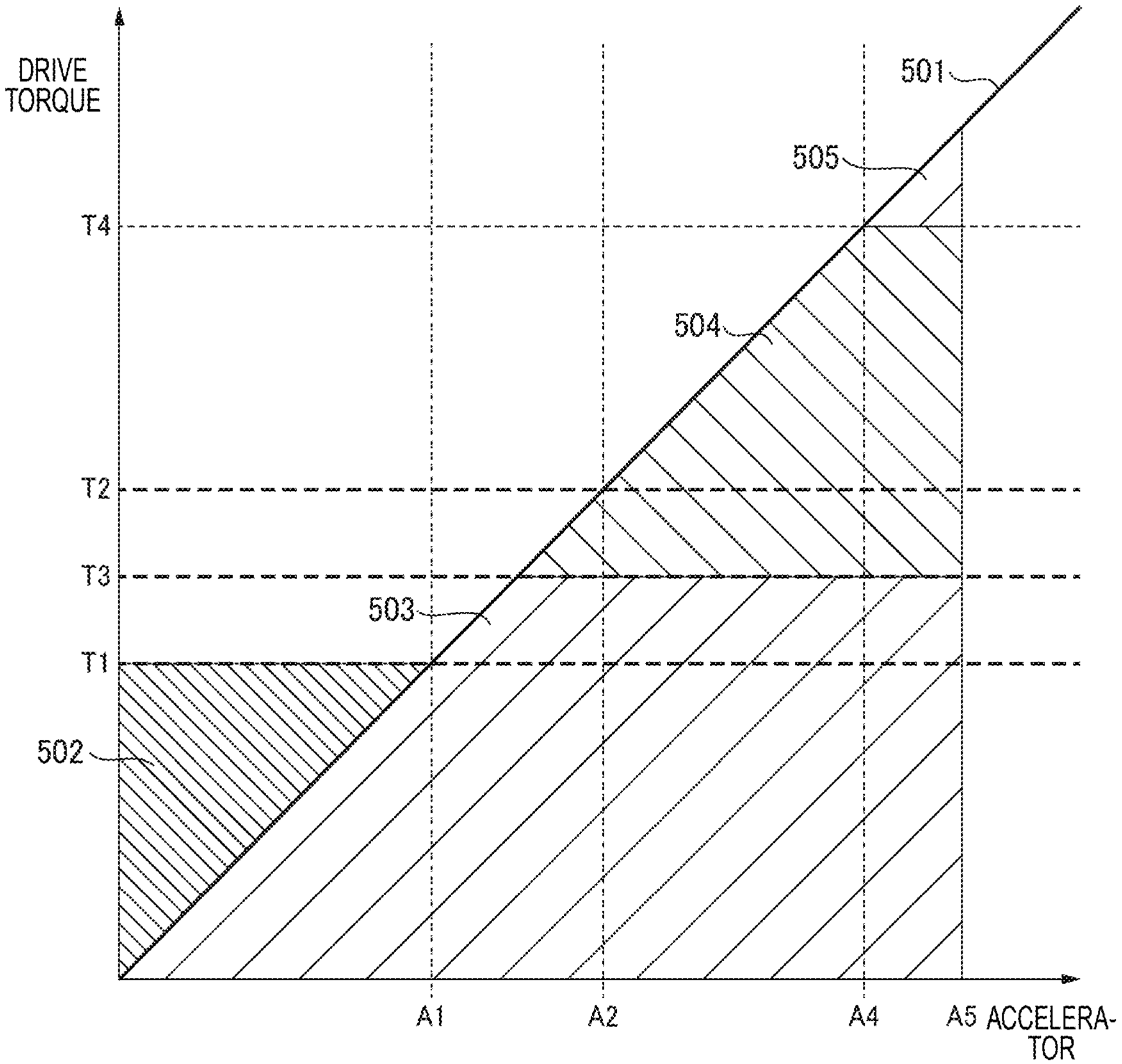
FIG. 5 is a graph for illustrating traveling control in a parallel mode according to a first embodiment.

FIG. 5 is a graph for illustrating traveling control in the parallel mode according to this embodiment. In FIG. 5, a vertical axis represents a drive torque, and a horizontal axis represents an amount of accelerator operation. A graph 501 shows a required drive torque. As FIG. 2, for simplicity of description, an example is shown in which the drive torque increases at the same increase rate depending on the amount of accelerator operation, but the change rate is not necessarily limited to this.

In FIG. 5, an area 502 shows an engine power generation torque in the drive torque generated by the engine 101. An area 503 shows a drive torque for traveling in the drive torque generated by the engine 101. An area 504 shows a motor assist torque. An area 505 shows drive torque for traveling additionally generated by the engine 101 in response to a request.

In this embodiment, an amount A3 of accelerator operation, which corresponds to a position where the fuel consumption rate of the engine 101 and the fuel consumption rate of the motor 107 are reversed as described with reference to FIG. 4, is set as a threshold. In this case, a relationship between an assist start torque T3, an engine fuel efficiency torque T1, and an engine maximum torque T2 corresponding to A3 is T1<T3<T2.

The amount of accelerator operation is the same as in FIG. 2 up to A3. When the amount of accelerator operation exceeds A3, motor assistance begins. In this case, when the amount of accelerator operation increases, the engine drive torque is kept constant and the motor assist torque is increased to output the required drive torque (in a range of A3 to A4). In other words, in the range of A3 to A4, by keeping the engine drive torque constant at T3, the output from the engine 101 is controlled so that there is a surplus power of (T2-T3).

There is an upper limit to the motor assist torque that can be assisted by the motor 107. When the amount of accelerator operation exceeds A4, the upper limit of the motor assist torque that can be assisted by the motor 107 will be exceeded. In this case, the engine drive torque by the engine 101, which had been constant, is further increased (to a range of A4 to A5). In other words, the engine 101 uses the surplus power of (T2-T3) to output up to the engine maximum torque.

Figure 6:
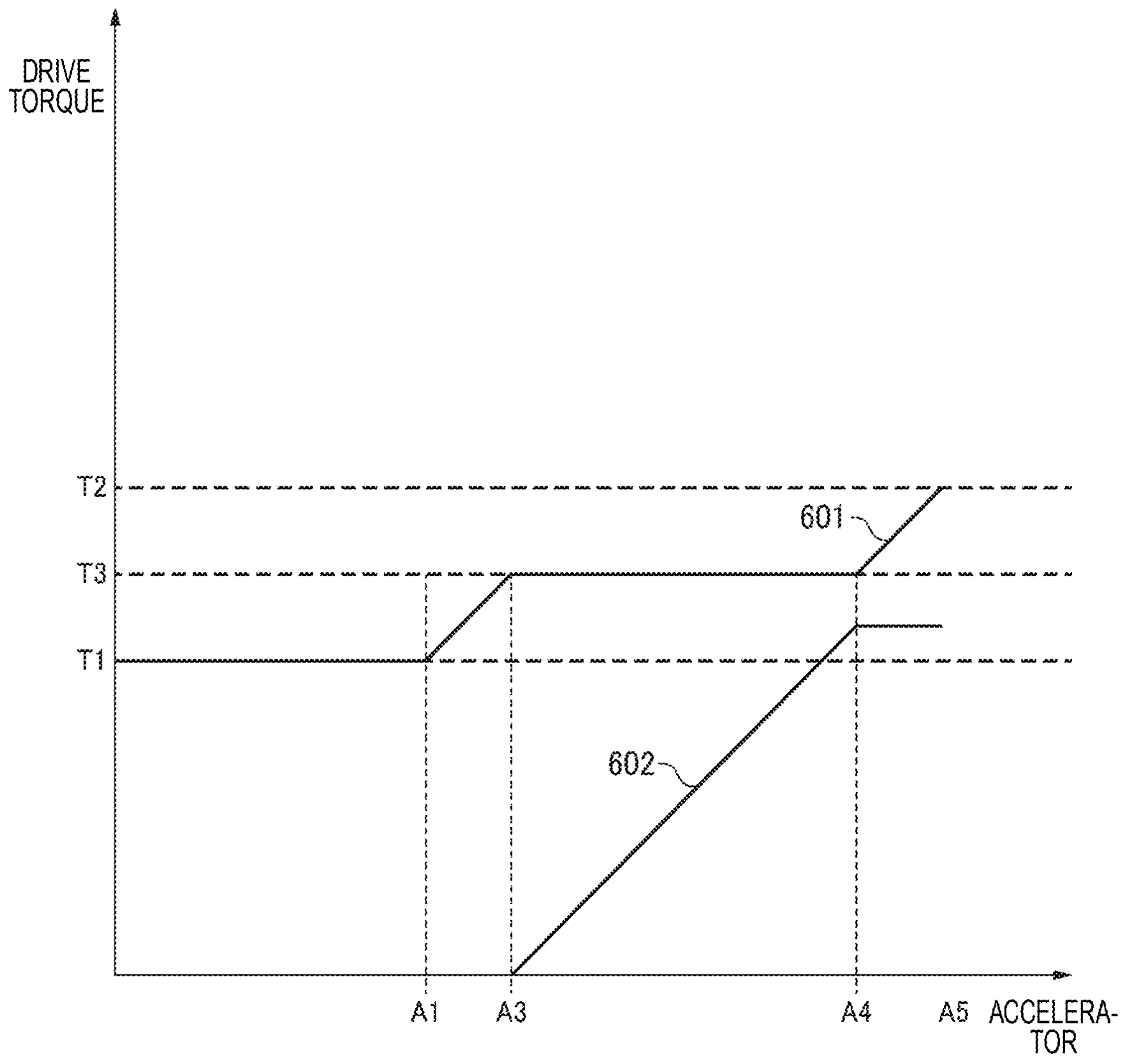
FIG. 6 is a graph for illustrating torques of an engine and a motor according to the first embodiment.

FIG. 6 is a graph for illustrating torques output by the engine 101 and the motor 107. In FIG. 6, a vertical axis represents a drive torque, and a horizontal axis represents an amount of accelerator operation. The drive torque and the amount of accelerator operation correspond to FIG. 5. A graph 601 shows a drive torque output by the engine 101. As shown in the graph 601, the drive torque output by the engine 101 is constant at T1 when the amount of accelerator operation is in a range of 0) to A1, and increases to T3 depending on the amount of operation in a range of A1 to A3. Further, the drive torque output by the engine 101 is constant at T3 in a range of A3 to A4, and increases to T2 depending on the amount of accelerator operation in a range after A4.

As shown in a graph 602, the drive torque output by the motor 107 is constant at 0) when the amount of accelerator operation is in a range of 0 to A3, and increases up to the upper limit of the motor assist torque according to the amount of operation in a range of A3 to A4. After the motor assist torque reaches the upper limit, the drive torque output by the motor 107 becomes constant.

Figure 7:
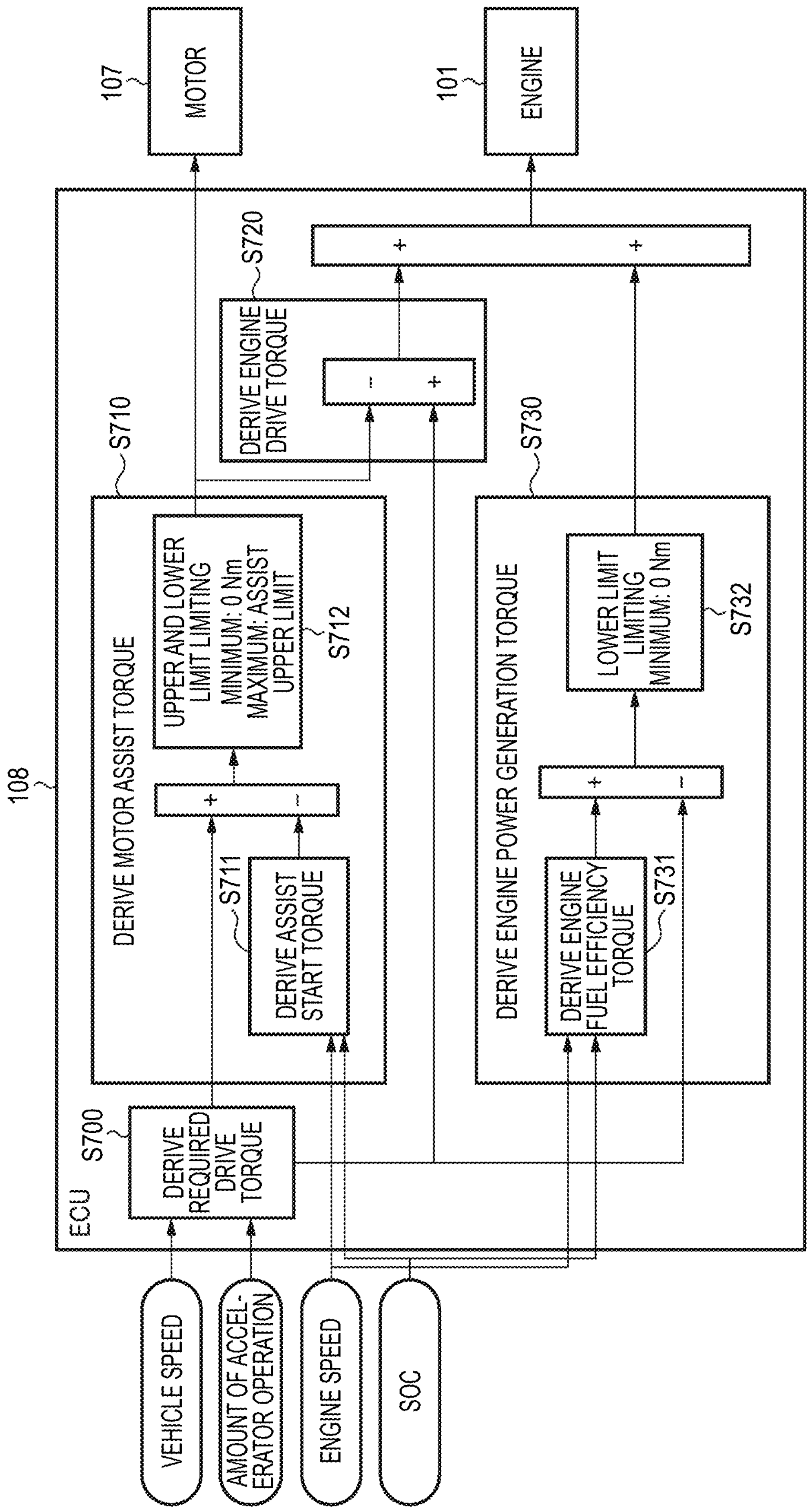
FIG. 7 is a schematic diagram for illustrating flow of torque control according to the first embodiment.

FIG. 7 is a conceptual diagram for illustrating torque control during parallel mode traveling by the ECU 108 according to this embodiment. As illustrated in FIG. 1, the ECU 108 can acquire various pieces of state information during traveling of the vehicle 100 via various sensors. In this embodiment, the ECU 108 can timely acquire the vehicle speed, amount of accelerator operation, engine speed, and remaining charge of the battery (SOC).

The ECU 108 derives the required drive torque based on the vehicle speed and the amount of accelerator operation (step S700). The required drive torque may be derived based on a predefined table or may be derived using a predefined calculation formula.

The ECU 108 derives the motor assist torque based on the required drive torque derived in step S700, the engine speed, and the remaining charge of the battery (step S710). First, the ECU 108 derives the assist start torque based on the engine speed and the remaining charge of the battery (step S711). The assist start torque may be derived based on a predefined table or may be derived using a predefined calculation formula. Next, the ECU 108 performs upper and lower limit limiting processing on a value obtained by subtracting the assist start torque derived in step S711 from the required drive torque derived in step S700 (step S712). The upper limit here is the upper limit of the motor assist torque defined based on the remaining charge of the battery, and the like. The lower limit is 0 Nm. When the assist start torque is greater than the required drive torque, the value will be a negative value, so in that case, the limitation will be performed at the lower limit of 0 Nm. Then, the ECU 108 controls the motor 107 by outputting a control signal for outputting the derived motor assist torque to the motor 107.

The ECU 108 derives the engine power generation torque based on the required drive torque derived in step S700, the engine speed, and the remaining charge of the battery (step S730). First, the ECU 108 derives the engine fuel efficiency torque based on the engine speed and the remaining charge of the battery (step S731). The engine fuel efficiency torque may be derived based on a predefined table, or may be derived using a predefined calculation formula. Next, the ECU 108 performs lower limit limiting processing on a value obtained by subtracting the required drive torque derived in step S700 from the engine fuel efficiency torque derived in step S731 (step S732). The lower limit here is 0 Nm. When the required drive torque is greater than the engine fuel efficiency torque, the value will be a negative value, so in that case, the limitation will be performed at the lower limit of 0 Nm.

Further, the ECU 108 subtracts the motor assist torque derived in step S710 from the required drive torque derived in step S700 to derive the engine drive torque (step S720). Further, the ECU 108 adds the engine power generation torque derived in step S730 to the engine drive torque derived in step S720. Then, the ECU 108 controls the engine 101 by outputting a control signal for outputting the derived engine drive torque to the engine 101.

The derivation processes shown in FIG. 7 are performed simultaneously in parallel. Alternatively, as illustrated in FIG. 6 and other figures, because the control timings of the engine 101 and the motor 107 are different, some of the derivation processes in FIG. 7 may be omitted depending on the amount of accelerator operation.

[Control Flow]

Figure 8:
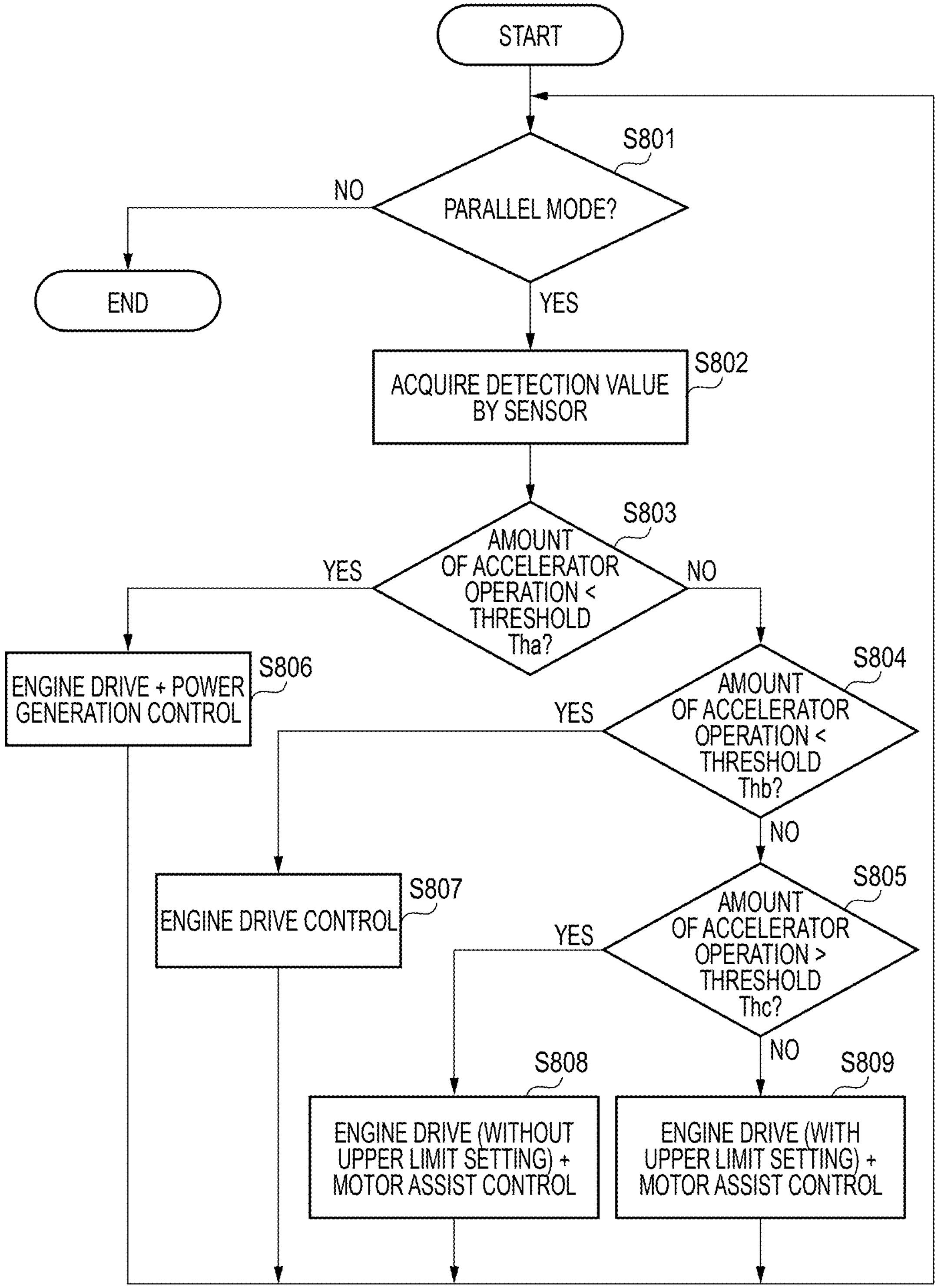
FIG. 8 is a flowchart of a traveling control process according to the first embodiment.

FIG. 8 is a flowchart of a control process according to this embodiment. This process flow may be realized by the ECU 108 reading and executing programs and various data according to this embodiment. In this case, the ECU 108 performs control by coordinating with various parts of the vehicle 100 by transmitting data to and receiving data from the various parts. When performing this process, the vehicle 100 is in a state where the vehicle can travel, and is traveling in one of the traveling modes described above.

In step S801, the ECU 108 determines whether the current traveling mode of the vehicle 100 is the parallel mode. That is, it is determined whether the traveling mode is the mode which allows traveling using both the engine 101 and the motor 107 as drive sources. When the mode is the parallel mode (YES in step S801), the processing by the ECU 108 proceeds to step S802. On the other hand, when the mode is not the parallel mode (NO in step S801), this process flow ends. In this case, the vehicle 100 continues to travel in a mode other than the parallel mode.

In step S802, the ECU 108 acquires detection values by various sensors. In this embodiment, at least the speed, amount of accelerator operation, engine speed, and remaining charge of the battery are acquired.

In step S803, the ECU 108 determines whether the amount of accelerator operation is smaller than a threshold Tha. The threshold Tha corresponds to A1 shown in FIG. 5. When the amount of accelerator operation is smaller than the threshold Tha (YES in step S803), the processing by the ECU 108 proceeds to step S806. On the other hand, when the amount of accelerator operation is equal to or greater than the threshold Tha (NO in step S803), the processing by the ECU 108 proceeds to step S804.

In step S804, the ECU 108 determines whether the amount of accelerator operation is smaller than a threshold Thb. The threshold Thb corresponds to A3 shown in FIG. 5. When the amount of accelerator operation is smaller than the threshold Thb (YES in step S804), the processing by the ECU 108 proceeds to step S807. On the other hand, when the amount of accelerator operation is equal to or greater than the threshold Thb (NO in step S804), the processing by the ECU 108 proceeds to step S805.

In step S805, the ECU 108 determines whether the amount of accelerator operation is greater than a threshold Thc. The threshold Thc corresponds to A4 shown in FIG. 5. When the amount of accelerator operation is greater than the threshold Thc (YES in step S805), the processing by the ECU 108 proceeds to step S808. On the other hand, when the amount of accelerator operation is equal to or less than the threshold Thc (NO in step S805), the processing by the ECU 108 proceeds to step S809.

In step S806, the ECU 108 controls engine drive and power generation. That is, this process is a control in a case where the amount of accelerator operation is in the range of 0 to A1 in FIG. 5, and traveling and power generation are performed using the engine fuel efficiency torque of the engine 101. Then, the process of the ECU 108 returns to step S801 and the process is repeated.

In step S807, the ECU 108 drives the engine. That is, this process is a control in a case where the amount of accelerator operation is in a range of A1 to A3 in FIG. 5, and traveling is performed using the torque of engine 101 (>engine fuel efficiency torque) that corresponds to the amount of accelerator operation. Then, the processing of the ECU 108 returns to step S801 and the processing is repeated.

In step S808, the ECU 108 performs engine drive and motor assist control. That is, this process is a control in a case where the amount of accelerator operation is in a range of A4 to A5 in FIG. 5, and traveling is performed with the engine drive torque (≤engine maximum torque) by the engine 101 and motor assist torque according to the amount of accelerator operation. Then, the processing of the ECU 108 returns to step S801 and the processing is repeated.

In step S809, the ECU 108 performs engine drive and motor assist control. That is, this process is a control in a case where the amount of accelerator operation is in a range of A3 to A4 in FIG. 5, and traveling is performed using the engine drive torque (=assist start torque) by the engine 101 and the motor assist torque. Then, the processing of the ECU 108 returns to step S801 and the processing is repeated.

As described above, according to this embodiment, in the parallel mode in which the engine and the motor can be used as drive sources, it is possible to perform traveling control with better fuel efficiency than that of the related art.

Second Embodiment

A second embodiment of the present invention will be described below. The motor assist torque is obtained by consuming electric power from the battery 114 and driving the motor 107. Therefore, depending on the state of the battery 114, it is expected that the motor assist torque cannot be used appropriately. In this embodiment, therefore, a form in which control is switched according to the remaining charge (SOC) of the battery 114 will be described. Descriptions of parts that are the same as those of the first embodiment will be omitted as appropriate, and the description will focus on the differences.

[Traveling Control]

Figure 9:
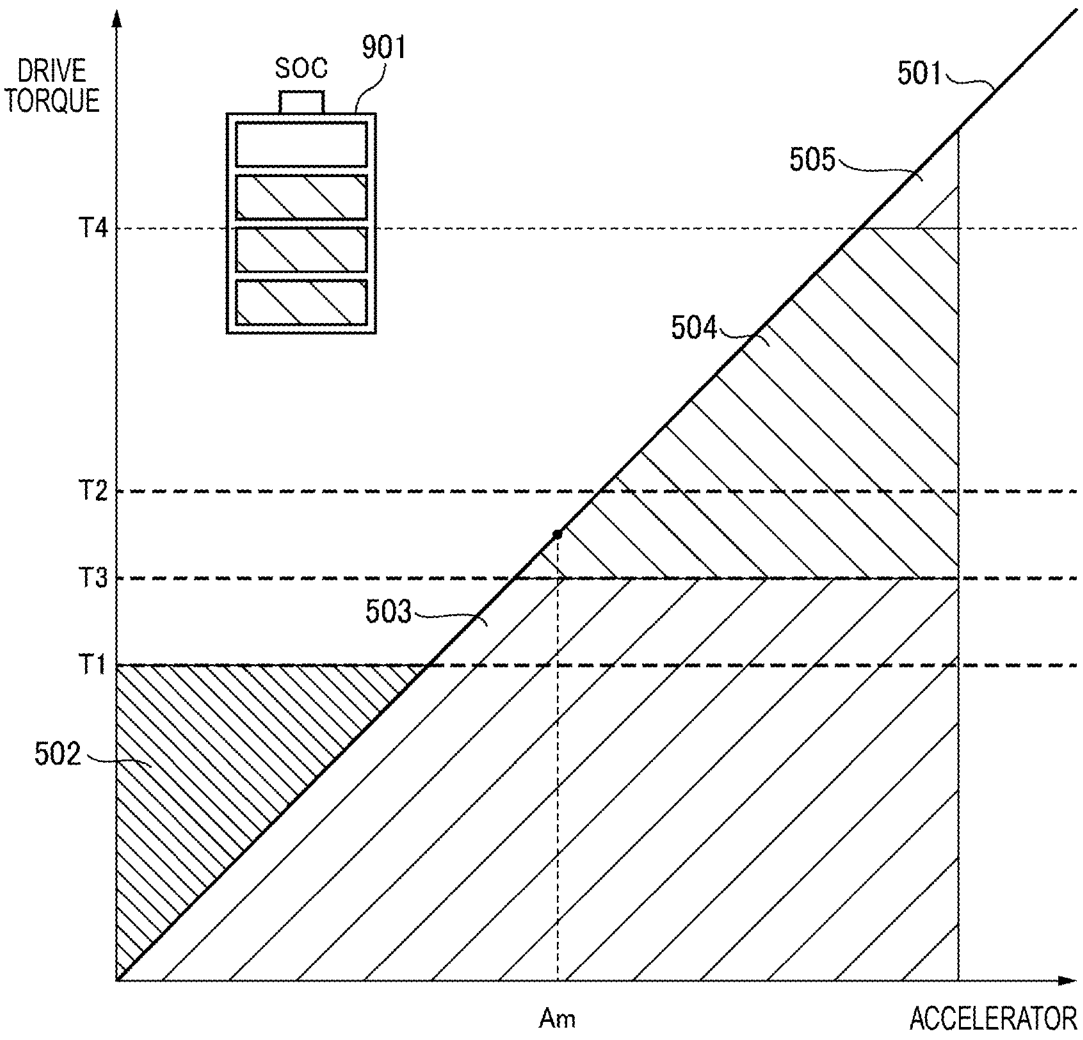
FIG. 9 is a graph for illustrating traveling control in a parallel mode according to a second embodiment.
Figure 10:
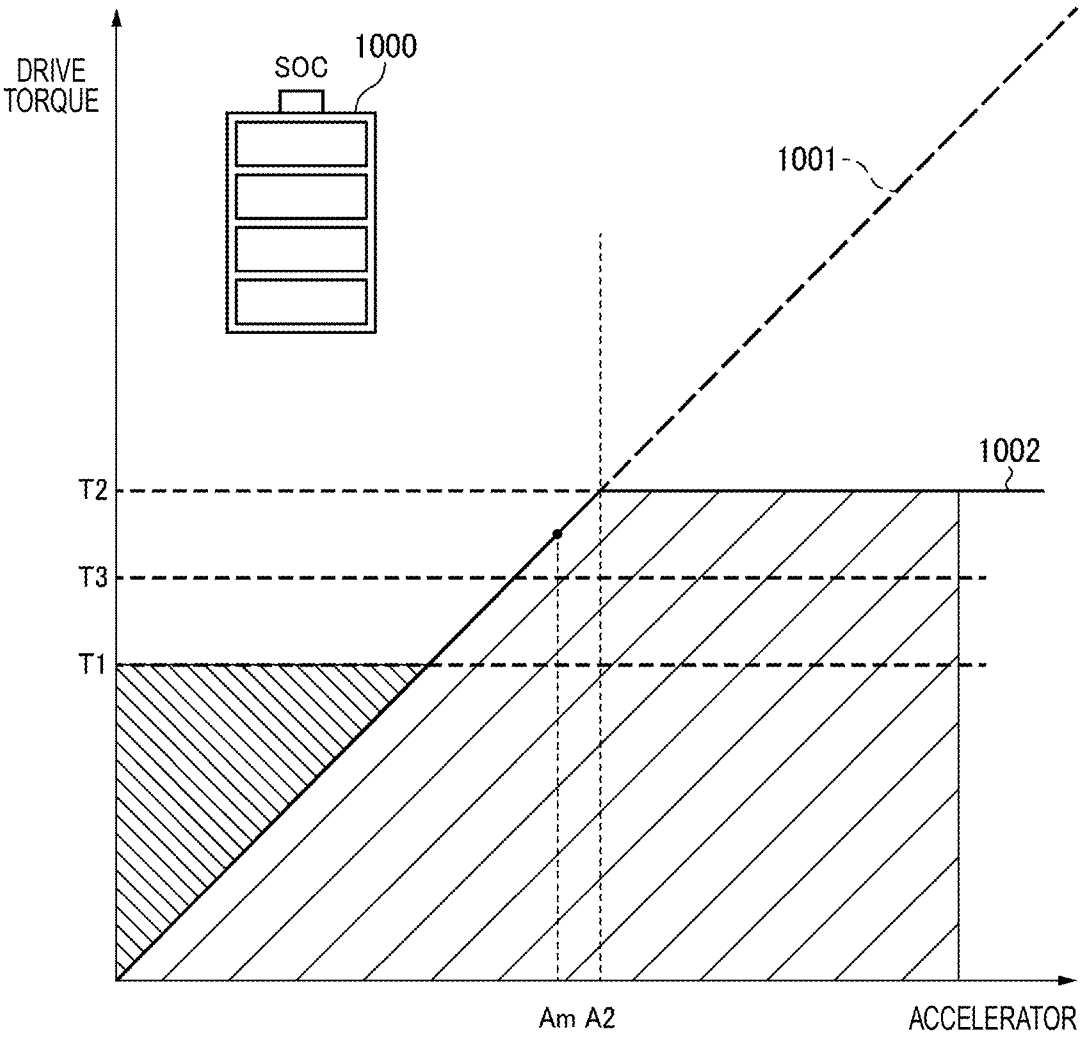
FIG. 10 is a graph for illustrating traveling control in a parallel mode of the related art.
Figure 11:
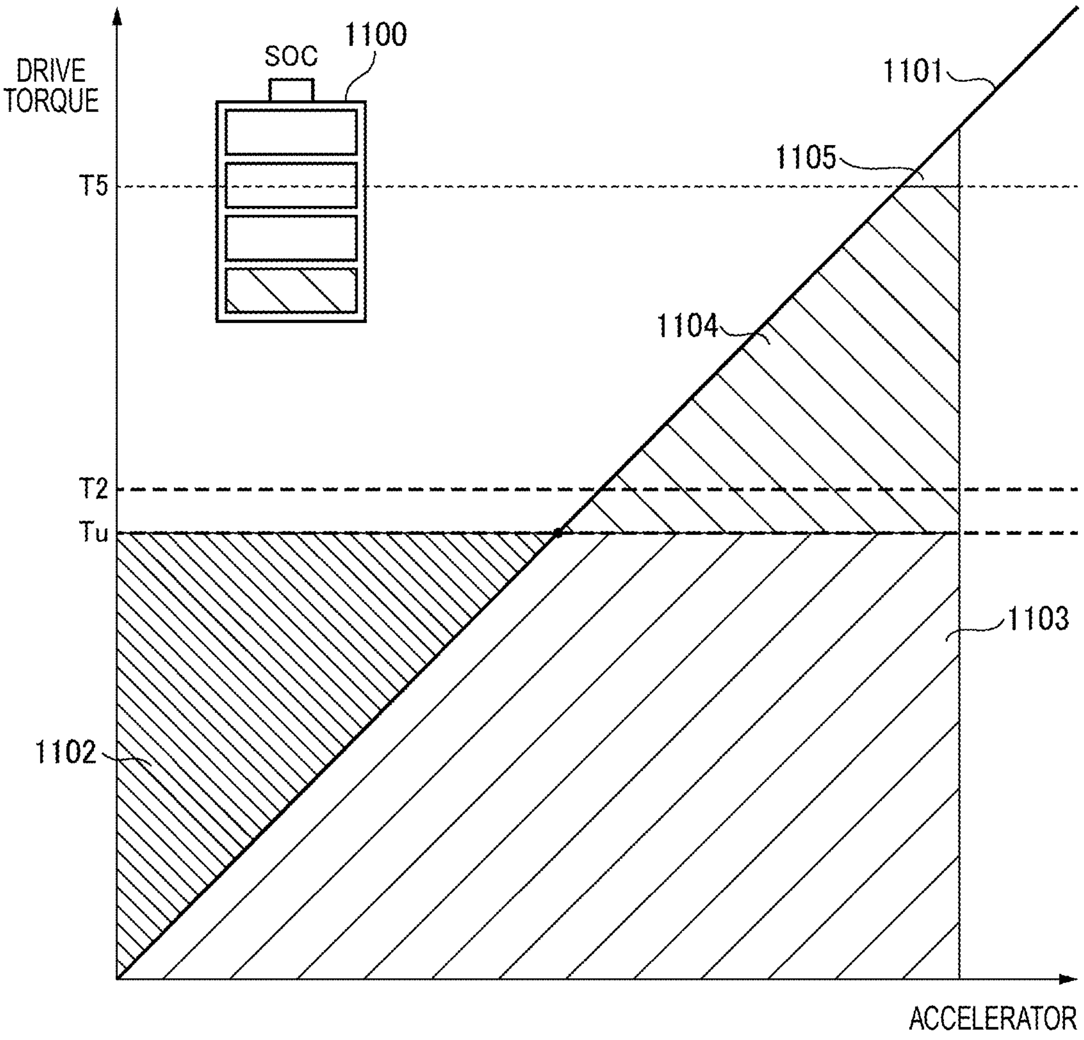
FIG. 11 is a graph for illustrating traveling control in the parallel mode according to the second embodiment.

FIGS. 9 to 11 are graphs illustrating traveling control in a parallel mode according to this embodiment. In FIGS. 9 to 11, a vertical axis represents a drive torque, and a horizontal axis represents an amount of accelerator operation. As with FIG. 5 shown in the first embodiment, for simplicity of description, an example is shown in which the required drive torque increases at the same increase rate depending on the amount of accelerator operation, but the change rate is not necessarily limited to this.

In FIG. 9, as shown by an icon 901, the remaining charge (SOC) of the battery 114 is shown in four stages from 0 to 4, and is assumed to be "3" here. In addition, in this embodiment, the threshold for the remaining charge of the battery 114 is assumed to be "2". In the case of FIG. 9, the remaining charge of the battery 114 exceeds the threshold, so the operation in this case is the same as that described in FIG. 5 of the first embodiment. Therefore, when the amount of accelerator operation is Am, the required drive torque is provided by the assist start torque T3 by the engine 101 and the motor assist torque.

In FIG. 10, the remaining charge (SOC) of the battery 114 is "0" as shown by an icon 1000. A graph 1001 shows the required drive torque. A graph 1002 shows a drive torque that can be output. In the case of FIG. 10, the remaining charge of the battery 114 is below a threshold. In this case, electric power cannot be supplied from the battery 114 to the motor 107, so motor assist cannot be started even when the amount of accelerator operation becomes Am and the required drive torque exceeds the assist start torque T3. Therefore, the required drive torque is provided by the engine 101 within the engine maximum torque. In other words, even in the parallel mode, a drive torque equal to or greater than the engine maximum torque cannot be output.

Therefore, in this embodiment, a range in which the engine 101 outputs torque and performs power generation is changed according to the remaining charge of the battery 114.

In FIG. 11, the remaining charge (SOC) of the battery 114 is "1" as shown by an icon 1100. A graph 1101 shows the required drive torque. In the case of FIG. 11, the remaining charge of the battery 114 is below the threshold. Therefore, in this embodiment, the threshold for the torque is increased so as to expand the range in which the engine outputs the drive torque and performs power generation. As illustrated in FIG. 9, in the control of the first embodiment, the threshold is set to T1 and the power generation operation is terminated. In contrast, in this embodiment, the threshold is increased to a threshold Tu. A torque relationship at this time is T1<Tu<T2. In this case, Tu may be greater than T3 in FIG. 9. In an example of FIGS. 11, T1 and T3 shown in FIG. 9 are made to match.

In FIG. 11, an area 1102 shows an engine power generation torque in the drive torque produced by the engine 101. Area 1103 shows drive torque for traveling in the drive torque produced by engine 101. An area 1104 shows a motor assist torque. An area 1105 shows a drive torque for traveling additionally generated by the engine 101 in response to a request. In other words, in the example of FIG. 11, the threshold Tu serves as a boundary for switching between traveling and charging using the drive torque of the engine 101, and traveling using the drive torque of the engine 101 and motor assist torque.

By controlling in this way, when the amount of accelerator operation is equal to or less than a value corresponding to Tu, the required drive torque is supplied and the battery 114 is charged by driving the engine 101. On the other hand, when the amount of accelerator operation is greater than the value corresponding to Tu, the required drive torque is provided by the engine drive torque from the engine 101 and the motor assist torque. In this case, the engine drive torque is constant at Tu until the required drive torque reaches T5, and the motor assist torque increases in response to the accelerator operation. In other words, by keeping the engine drive torque constant at Tu, the output from the engine 101 is controlled so that there is a surplus power of (T2-Tu).

When the required drive torque reaches T5 or more, the motor assist torque has reached its upper limit, so the engine 101 uses the surplus power of (T2-Tu) to output up to the engine maximum torque.

[Control Flow]

Figure 12:
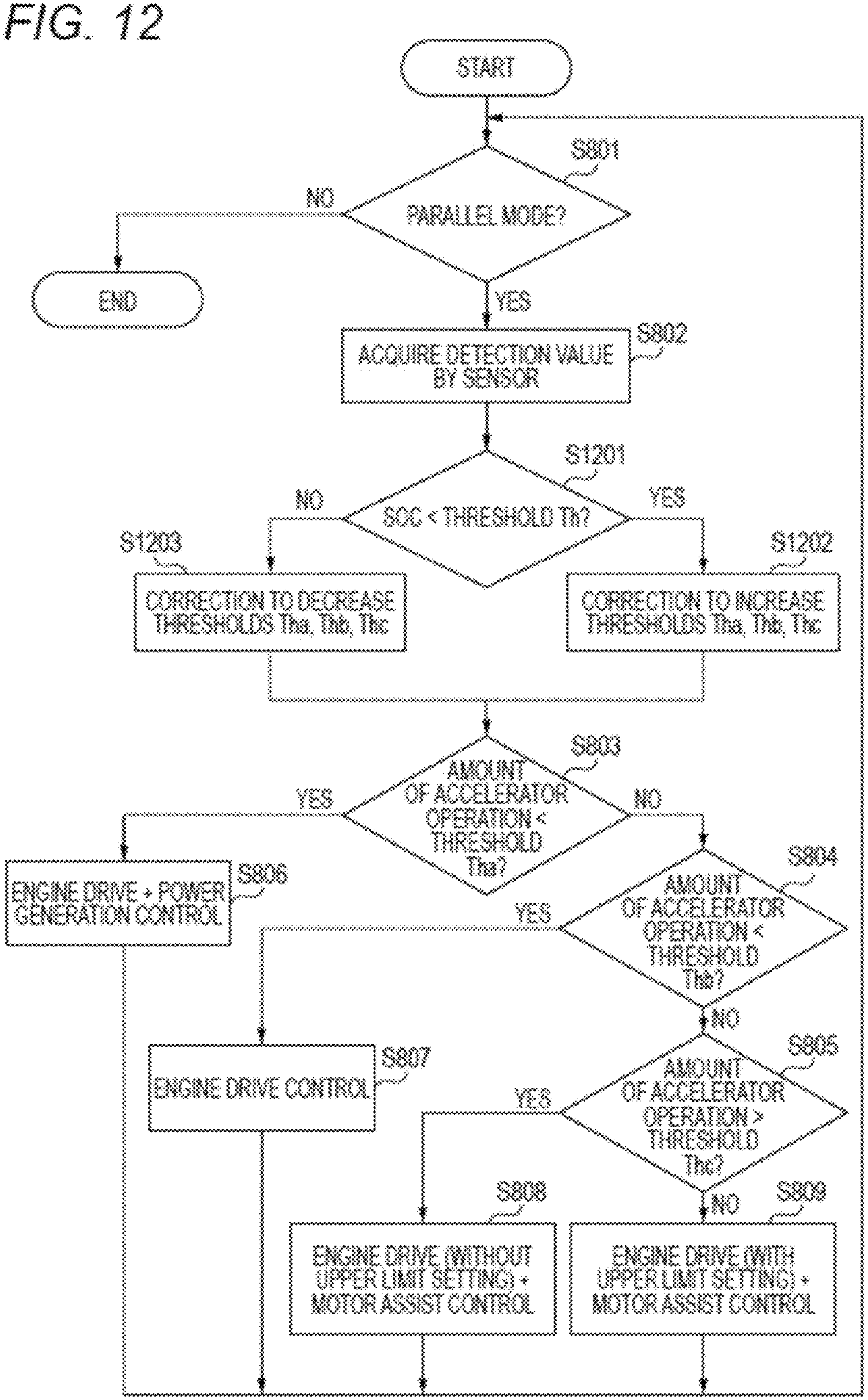
FIG. 12 is a flowchart of a traveling control process according to the second embodiment.

FIG. 12 is a flowchart of a control process according to this embodiment. This process flow may be realized by the ECU 108 reading and executing the program and various data according to this embodiment. In this case, the ECU 108 performs control by coordinating with various parts of the vehicle 100 by transmitting data to and receiving data from the various parts. When performing this process, the vehicle 100 is in a state of being able to travel, and is traveling in one of the traveling modes described above. The same reference signs are used for steps that are the same as those in the process shown in FIG. 8 of the first embodiment.

After step S802, the processing of the ECU 108 proceeds to step S1201. In step S1201, the ECU 108 determines whether the remaining charge of the battery 114 is smaller than the threshold Th. The threshold Th may be predefined. In the example described with reference to FIGS. 9 to 11, the remaining charge of the battery 114 is classified into four levels, with "2" being the threshold. The setting of the threshold Th is not limited to the above, and the threshold may be set in more detailed classifications or may be set to a specific remaining charge (for example, a percentage). When the remaining charge is smaller than the threshold Th (YES in step S1201), the processing of the ECU proceeds to step S1202. On the other hand, when the remaining charge is equal to or greater than the threshold Th (NO in step S1201), the processing of the ECU proceeds to step S1203.

In step S1202, the ECU 108 performs correction so as to increase thresholds Tha, Thb, and Thc. The set value for each threshold here may be specified in advance. In the example described using FIG. 11, the set value is set to a value at which the thresholds Tha and Thb match to each other and that is higher than the amount of accelerator operation corresponding to the assist start torque T3 in FIG. 9. Further, based on the maximum value of the motor assist torque and the increase in the thresholds Tha and Thb, the threshold Thc is set to a value of the amount of accelerator operation corresponding to the torque T5 in FIG. 11. Then, the processing of the ECU 108 proceeds to step S803.

In step S1203, the ECU 108 performs correction to decrease the thresholds Tha, Thb, and Thc. When step S1202 was performed in the past processing, the thresholds Tha, Thb, and Thc are decreased to the original thresholds in order to perform the control described in FIG. 9. On the other hand, when step S1202 was not performed in the past processing, this processing may be omitted and the thresholds Tha, Thb, and Thc may remain at the original thresholds. Then, the processing by the ECU 108 proceeds to step S803.

As described above, in addition to the effects of the first embodiment, this embodiment makes it possible to appropriately switch between traveling and power generation by an engine output, and assistance by the motor according to the remaining charge of the battery.

Other Embodiments

In the embodiment described above, the brake operation is described assuming an operation by the driver. However, the present invention is not limited to this, and the configuration of the present invention may be applied, for example, when an ECU or the like performs a brake operation in a driving assistance function or an autonomous driving function such as an Advanced Driver-Assistance Systems (ADAS) or an Autonomous Driving System (ADS).

In addition, in the present invention, a program or application for realizing the functions of one or more of the above-described embodiments can be supplied to a system or device via a network or a storage medium, and the like, and one or more processors in a computer of the system or device can read and execute the program, thereby realizing the present invention.

As such, the present invention is not limited to the above-described embodiments, and the present invention also contemplates mutual combinations of the various components of the embodiments, as well as modifications and applications by those skilled in the art based on the descriptions in the specification and well-known technologies, and these are included in the scope of protection sought.

As described above, the present specification discloses the following matters.

(1) A control device (for example, 108) for a vehicle (for example, 100) that can travel in a parallel mode using an engine drive torque by an engine (for example, 101) and a motor assist torque by a motor (for example, 107), the control device including:

a controller (for example, 108) configured to cause the vehicle to travel using the engine drive torque and the motor assist torque when a required drive torque (for example, 501) exceeds a first threshold (for example, T3), in which the first threshold is set to a value at which a fuel consumption rate of an output by the engine becomes worse than a fuel consumption rate of an output by the motor, and is set to a value lower than a maximum torque (for example, T2) that can be output by the engine.

According to this configuration, in the parallel mode in which the engine and the motor can be used as drive sources, it becomes possible to perform traveling control with better fuel efficiency than that of the related art.

(2) The control device for the vehicle according to (1), in which the controller is configured to cause the vehicle to travel by keeping the engine drive torque constant and adjusting the motor assist torque when the required drive torque is between the first threshold and a second threshold (for example, T4) that is greater than the first threshold, and the second threshold corresponds to a sum of the engine drive torque kept constant and a maximum torque that can be output by the motor.

According to this configuration, it is possible to improve the overall fuel efficiency by suppressing fuel consumption on the engine side while outputting a torque on the motor side, which has better fuel efficiency.

(3) The control device for the vehicle according to (2), in which when the required drive torque exceeds the second threshold, the controller is configured to cause the vehicle to travel by further increasing an output from the engine drive torque that is kept constant.

According to this configuration, when the maximum output that can be output by the motor is exceeded, the required drive torque can be provided by using the maximum output torque of the engine side.

(4) The control device for the vehicle according to any one of (1) to (3), in which when the required drive torque is smaller than a third threshold (for example, T1) that is smaller than the first threshold, the controller is configured to cause the engine drive torque to be constant while performing traveling of the vehicle and charging of a battery, and is configured not to use the motor assist torque.

According to this configuration, it is possible to travel the vehicle at a fuel-efficient engine torque while using the surplus torque to generate electricity.

(5) The control device for the vehicle according to (4), further including:

an acquisition portion (for example, 112) configured to acquire a remaining charge of the battery, in which the controller is configured to set the third threshold higher when the remaining charge of the battery is lower than a predetermined threshold, than that when the remaining charge of the battery is higher than the predetermined threshold.

According to this configuration, it is possible to improve fuel efficiency while maintaining a balance between the engine output and the motor output according to the remaining charge of the battery.

(6) The control device for the vehicle according to (5), in which when the remaining charge of the battery is lower than the predetermined threshold, the controller is configured to set the first threshold and the third threshold higher than those when the remaining charge of the battery is higher than the predetermined threshold, and configured to make the first threshold and the third threshold match to each other.

According to this configuration, it is possible to improve fuel efficiency while maintaining a balance between traveling with engine output, power generation, and traveling with the engine output and motor output according to the remaining charge of the battery.

REFERENCE SIGNS LIST

100: vehicle
101: engine
102: generator
103: engine clutch
104: drive shaft
105: driving wheel (front wheel)
106: motor clutch
107: motor
108: ECU
109: accelerator opening sensor
110: brake sensor
111: speed sensor
112: engine rotation sensor
113: battery remaining charge sensor
114: battery
115: axle
116: driven wheel (rear wheel)

The invention claimed is:

1. A control device for a vehicle that can travel in a parallel mode using an engine drive torque by an engine and a motor assist torque by a motor, the control device comprising:

a controller configured to cause the vehicle to travel using the engine drive torque and the motor assist torque when a required drive torque exceeds a first threshold, wherein the first threshold is set to a value at which a fuel consumption rate of an output by the engine becomes worse than a fuel consumption rate of an output by the motor, and is set to a value lower than a maximum torque that can be output by the engine, the controller is configured to cause the vehicle to travel by keeping the engine drive torque constant and adjusting the motor assist torque when the required drive torque is between the first threshold and a second threshold that is greater than the first threshold, the second threshold corresponds to a sum of the engine drive torque kept constant and a maximum torque that can be output by the motor, and the first threshold is an assist start torque to start assisting with the output of the motor.

2. The control device for the vehicle according to claim 1, wherein when the required drive torque exceeds the second threshold, the controller is configured to cause the vehicle to travel by further increasing an output from the engine drive torque that is kept constant.

3. A control device for a vehicle that can travel in a parallel mode using an engine drive torque by an engine and a motor assist torque by a motor, the control device comprising:

a controller configured to cause the vehicle to travel using the engine drive torque and the motor assist torque when a required drive torque exceeds a first threshold, wherein the first threshold is set to a value at which a fuel consumption rate of an output by the engine becomes worse than a fuel consumption rate of an output by the motor, and is set to a value lower than a maximum torque that can be output by the engine, when the required drive torque is smaller than a third threshold that is smaller than the first threshold, the controller is configured to cause the engine drive torque to be constant while performing traveling of the vehicle and charging of a battery, and is configured not to use the motor assist torque, and the first threshold is an assist start torque to start assisting with the output of the motor.

4. The control device for the vehicle according to claim 3, further comprising:

an acquisition portion configured to acquire a remaining charge of the battery, wherein the controller is configured to set the third threshold higher when the remaining charge of the battery is lower than a predetermined threshold, than that when the remaining charge of the battery is higher than the predetermined threshold.

5. The control device for the vehicle according to claim 4, wherein when the remaining charge of the battery is lower than the predetermined threshold, the controller is configured to set the first threshold and the third threshold higher than those when the remaining charge of the battery is higher than the predetermined threshold, and configured to make the first threshold and the third threshold match to each other.

* * * * *